United States Patent [19]

Fujii et al.

[11] 4,348,164
[45] Sep. 7, 1982

[54] APPARATUS FOR CONTINUOUS PRODUCTION OF A SLAB OF POLYURETHANE FOAM

[75] Inventors: Osamu Fujii, Kounosu; Toshio Kishimoto, Kawagoe; Hisao Kosuge, Sakato; Ryoji Nagamine, Kawagoe, all of Japan

[73] Assignee: Toyo Rubber Chemical Industrial Corporation, Tokyo, Japan

[21] Appl. No.: 213,046

[22] Filed: Dec. 4, 1980

Related U.S. Application Data

[63] Continuation of Ser. No. 56,956, Jul. 12, 1979, abandoned, which is a continuation-in-part of Ser. No. 838,449, Oct. 3, 1977, abandoned.

[30] Foreign Application Priority Data

Oct. 4, 1976 [JP] Japan .................................. 51-119101
Oct. 4, 1976 [JP] Japan .................................. 51-119102

[51] Int. Cl.$^3$ ............................................. B29D 27/04
[52] U.S. Cl. ..................................... 425/89; 264/46.2; 264/338; 425/224; 425/817 C
[58] Field of Search .................. 264/51, DIG. 84, 338, 264/DIG. 2; 425/4 C, 817 C, 89, 224

[56] References Cited

U.S. PATENT DOCUMENTS

| | | | |
|---|---|---|---|
| 3,354,503 | 11/1967 | Joseph et al. | 264/DIG. 84 |
| 3,435,102 | 3/1969 | Sullhofer | 264/51 |
| 3,734,668 | 5/1973 | Porter | 425/4 C |
| 3,764,247 | 10/1973 | Garrett et al. | 425/224 |
| 4,043,719 | 8/1977 | Jones | 425/224 X |
| 4,252,515 | 2/1981 | Meunier et al. | 425/224 |

*Primary Examiner*—Philip Anderson
*Attorney, Agent, or Firm*—Frishauf, Holtz, Goodman & Woodward

[57] ABSTRACT

A continuous production process for making a slab of polyurethane foam comprises preparing a foamable polyurethane composition, continuously feeding the composition to a horizontally moving trough to form a foaming mass on the trough, continuously pressing the top surface of the foaming mass with a pressure means over a zone including a zone extending from the foaming completion point to a point just prior to the completion of curing so as to make flat the top surface of the foaming mass, and horizontally moving the pressure means in synchronism with and in the same direction as the trough. Preferably, the composition is fed to the trough at such a rate as to produce a slab about 40 mm to 250 mm thick. The process can produce at a low cost polyurethane foam slabs which have no cavities and no cracks and which therefore have a uniform density or porosity.

5 Claims, 4 Drawing Figures

APPARATUS FOR CONTINUOUS PRODUCTION OF A SLAB OF POLYURETHANE FOAM

CROSS-REFERENCE TO RELATED APPLICATION

This is a continuation of application Ser. No. 56,956 filed July 12, 1979 now abandoned, which is a CIP of Ser. No. 838,449 filed Oct. 3, 1977, now abandoned.

BACKGROUND OF THE INVENTION

This invention relates to apparatus for continuous production of a slab made of polyurethane foam.

When slabs of polyurethane foam are made in accordance with the prior art, a huge mass of polyurethane foam, generally about 2000 mm(W)×900 mm(H)×2000 mm(L) is sliced into a plurality of slabs of a desired thickness of, for example, 100 mm. To be cured completely, such a mass must be allowed to stand for about 24 hours after the completion of foaming. During the curing process, the mass accumulates in it sufficient amount of heat of reaction to raise its temperature to about 150° C. to 170° C. This not only incurs the risk of fire but tends to cause yellowing of the polyurethane foam due to the internal heat build-up and thereby diminishes the commercial value of the product. In order to dissipate such a large amount of heat as efficiently as possible, a well-ventilated storehouse of fireproof structure having accommodation for huge porous masses as described above is required, which necessarily raises the cost of equipment.

Furthermore, if the final product has a sheet of, for example, fabric laminated on its surface, the manufacture requires a number of additional steps such as applying an adhesive to the surface of a slab and laminating a sheet onto the surface of the slab.

The invention described in U.S. Patent Application Ser. No. 838,449 aims chiefly to eliminate the above-mentioned drawbacks of the prior art. More precisely, its primary object is to provide a method for continuous production of a slab of porous material, i.e. polyurethane foam, which comprises steps of providing a creamy foamable material of which the chemical reaction has been initiated, continuously feeding said foamable material to a horizontally moving trough to form a foaming mass on said moving trough, pressing the top surface of said foaming mass with a pressure means over a zone extending from a point just prior to the completion of foaming to at least the point of completion of foaming to make flat the top surface of said foaming mass, and horizontally moving said pressure means in synchronism with, and in the same direction as, said trough.

However, the inventors found that some of the slabs of polyurethane foam which had been produced by the method had cavities or cracks, which had been locally formed due to destruction of many of the cells constituting the foam. The method of Ser. No. 838,449 therefore cannot always provide slabs of a uniform density or porosity.

SUMMARY OF THE INVENTION

Accordingly it is an object of the present invention to improve the invention described in U.S. Patent Application Ser. No. 838,449.

According to this invention, there is provided an apparatus for continuous production of a slab of polyurethane foam having a fabric sheet laminated on at least one of its surfaces. The apparatus comprises (A) a horizontally moving trough constituted by a bottom plate or surface portion including first and second endless belt conveyors arranged one after the other in a horizontal direction and a pair of sidewalls each including a horizontally movable vertical sheet; (B) feeding means for feeding a foamable composition to the moving trough to form a foaming mass on the moving trough; (C) pressure means for lightly pressing the top surface of the foaming mass over a zone including a zone extending from the foaming completion point to a point just prior to the completion of curing; and (D) sheet feeding means for continuously feeding a fabric sheet between the under surface of the foaming mass and the second endless belt conveyor through the space between the first and second endless belt conveyors while the foaming mass remains adhesive though completely foamed, so as to bond the fabric sheet to the under surface of the foaming mass.

The apparatus according to this invention can produce a laminated article comprised of a slab which has no cavities and no cracks and a fabric sheet is not impregnated with the polyurethane composition and maintains its characteristics.

DESCRIPTION OF THE PREFERRED EMBODIMENTS

Figure 1:
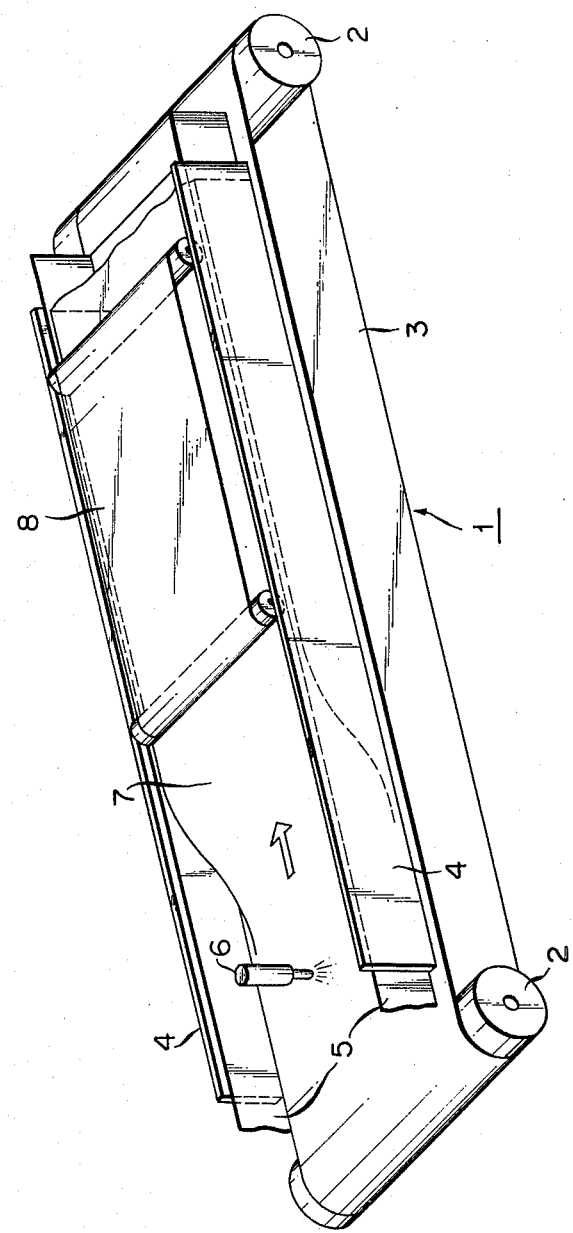
FIG. 1 is a perspective view of an exemplary apparatus for carrying out the method of this invention.

This invention uses a horizontally moving trough. The bottom of the trough may be composed of a conveyor comprising an endless belt. Each of the sidewalls of the trough may be composed of an endless belt having a vertical belt surface. Preferably, each of the sidewalls is composed of a vertical sheet or strip moving horizontally in synchronism with, and in the same direction as, the conveyor.

In an embodiment of this invention, a sheet is continuously fed into a gap between a pressure means such as an endless belt and a foaming means. After the mass is completely foamed, the sheet may be stripped from the top surface of a foaming mass or may be bonded to a top surface of the foaming mass so as to constitute a part of the final product. Another sheet may be continuously fed into a gap between the foaming mass and the conveyor, i.e. bottom of the trough. After the mass is completely foamed, this sheet may be stripped from the under surface of the foaming mass or may be bonded to the under surface of the foaming mass so as to constitute a part of the final product. The vertical sheets, i.e. sidewalls of the trough, may be bonded to the sides of the foaming mass so as to constitute parts of the final product. However, they are preferably stripped from the sides of the foaming mass after the mass is completely foamed.

This invention uses a foamable polyurethane composition. The composition is either a creamy liquid in which a chemical reaction has already been initiated or a liquid in which a chemical reaction starts immediately after it is applied from a nozzle.

A desirable example of the polyurethane foam composition used in this invention is made of the following components:

| Components | Parts by Weight |
| --- | --- |
| Trifunctional polyetherpolyol (molecular weight: 3000) | 100.0 |
| Tolylene Diisocyanate (T-80) | 83.0 |
| Water (foaming agent) | 7.0 |
| Triethylenediamine (catalyst) | 0.2 |
| Normal ethylmorpholine (catalyst) | 2.5 |
| Silicone oil (foam stabilizer) | 3.0 |
| Dibutyltin Dilaurate (catalyst) | 0.3 |
| Freon-11 (foaming promoting agent) | 5.0 |

According to this invention, it is preferred that all the components, but tolylenediisocyanate, should be mixed before being supplied to a feeding means such as a feed nozzle. Tolylenediisocyanate is not mixed with the other components until it is supplied to the feeding means.

The foaming mass is pressed on the top surface by a pressure means over a zone from the completion of foaming to a point just prior to the completion of curing. Preferably, the top surface of the foaming mass is lightly pressed continuously by an endless belt conveyor while it travels about 2 to 7 m right after the completion of foaming. An excessive pressure should not be applied on the foaming mass since it would otherwise deform the cells constituting the foaming mass. It is preferred that the foaming mass should be heated in a furnace while it is cured, thereby promoting the drying of the surface of the mass and shortening the curing time.

Now referring to the accompanying drawings, the embodiments of this invention will be described in detail.

In FIG. 1, a conveyor 1 comprises a pair of rollers 2 which are rotated by a proper drive means (not shown) and an endless belt 3 which is stretched on the rollers 2. The belt 3 is made of a releasable or strippable material such as a stainless steel sheet or polytetrafluoroethylene sheet. At both lateral edges of the top surface of the conveyor 1, a pair of vertical reinforcing plates 4 are longitudinally located in opposed and spaced relationship and fixed by suitable fastening means (not shown). On the inner side of each plate 4 a vertical sheet or a strip 5 made of, for example, paper with a releasing agent applied on it is put so as to travel in synchronism with, and in the same direction as, the endless belt 3 and then to be taken up a take-up roller (not shown). The conveyor 1 and a pair of strips 5 constitute a horizontally moving trough. More specifically, the conveyor 1 constitutes the bottom of the trough, and the strips 5 the sidewalls of the trough. Alternatively, the sidewalls of the trough may be composed of a pair of endless belts having a vertical belt surface and made of releasable material.

A nozzle 6 is provided above the conveyor 1 and moves across the conveyor 1 to feed the trough continuously with a liquid-like foamable polyurethane composition in which a chemical reaction has been initiated. The nozzle 6 feeds the foamable polyurethane composition at a rate which is changed to control the thickness of the final product. The composition is carried by the conveyor 1 which travels in the direction of arrow in FIG. 1. As the composition moves in this direction, its volume gradually increases and it forms a foaming mass 7. The top surface of the foaming mass 7 is pressed by a pressure means 8 and is made flat. The pressure means 8 extends about 2 m to 7 m above the conveyor 1 in the lengthwise direction of the conveyor 1. It comprises a pair of rollers and an endless belt stretched on the rollers. Its endless belt travels horizontally at the same speed and in the same direction as the endless belt 3 of the conveyor 1.

The foaming mass 7 now with its top made flat is put onto another conveyor (not shown). While it is carried by the other conveyor, it is cured completely and finally cut into slabs of a desired length. The thickness of the final product corresponds to that of the foaming mass after the completion of foaming. Unlike in the prior art, it is unnecessary to slice a thick foaming mass into a plurality of slabs.

The slab of soft or flexible polyurethane foam according to this invention is preferably about 40 mm to 250 mm thick. In the prior art, slabs about 40 mm to 250 mm thick were made by producing a slab about 900 mm thick and then slicing it to the desired thickness. This is because the considerably thick surface portion of the foaming mass was always hard and had to be cut off. According to this invention, the top surface portion of the foamed mass 7, which has been made flat by the pressure means 8, is thin and soft and can therefore be utilized as a part of the final product and need not therefore be cut off. Further, the slab made by the method according to this invention shows no local variation in density. That is, this invention provides a uniformly foamed porous mass. Still further, since the top surface of the foaming mass 7 is not pressed until the foaming is completed, the foaming mass 7 have neither cavities nor cracks. Moreover, unlike in the prior art, the foaming mass 7 does not catch fire or does not become yellow while it is cured.

Generally, the specific density of polyurethane foam is inversely proportional to the amount of foaming agent in the foamable material. More foaming agent means more heat of reaction which is generated while the foaming mass is cured. The heat of reaction cannot dissipate quickly if the polyurethane foam slab is thick as in the prior art and likely sets fire to the slab. It was therefore impossible with the prior art method to reduce the specific density of the slab to less than about 0.014. According to this invention, a much thinner slab is cured and then used as a final product. The heat of reaction can therefore well dissipate from the surface of the slab and never accumulates within the slab. Thus it is possible with this invention to continuously produce slabs of various specific densities, ranging from about 0.008. This invention therefore expands the use of polyurethane foam slabs.

Figure 2:
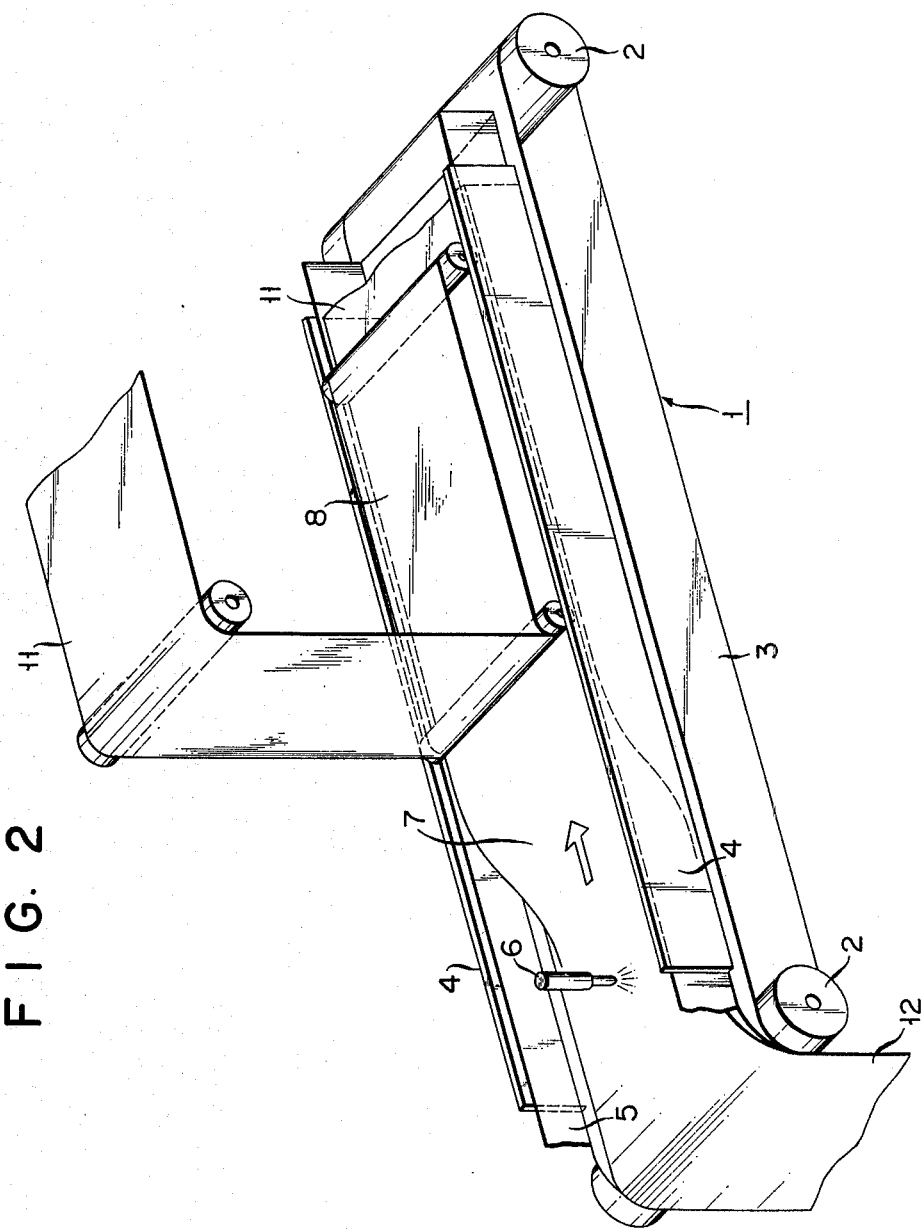
FIG. 2 is a perspective view of an apparatus of this invention which produces a laminated article comprised of a slab and two sheets bonded on the top and under surfaces of the slab, respectively.

FIG. 2 shows the essential parts of an apparatus for carrying out another method according to this invention. In FIG. 2, like parts are denoted by like or the same reference numerals as in FIG. 1.

As shown in FIG. 2, a sheet 11 is continuously fed into a gap between a pressure means 8 and a foaming mass 7, and another sheet 12 is continuously fed into a gap between a conveyor 1 and the foaming mass 7. Both sheets 11 and 12 are moved horizontally in synchronism with, and in the same direction as, an endless belt 3 of the conveyor 1. The sheet 11 may be stripped from the top surface of the forming mass 7 after the mass 7 is completely foamed, or it may be bonded to the top surface of the mass 7 so as to constitute a part of the product. Similarly, the sheet 12 may be stripped from the under surface of the mass 7 after the mass 7 is completely foamed, or it may be bonded to the under surface of the mass 7 so as to constitute a part of the final product.

If the sheets 11 and 12 are to be stripped, it is desirable to made them of a releasable material such as paraffin paper and Kraft paper. If they are to constitute a part of the final product, they may be made of any materials so long as they shield the foaming mass 7 from ultraviolet rays thereby to prevent yellowing of the mass 7. When the sheets 11 and 12 are made of water-soluble resin such as polyvinyl alcohol, it is preferred that they are about 0.02 mm to 0.1 mm thick. When they are made of woven fabric, unwoven fabric or unfoamed synthetic resin, it is preferred that they are 0.1 mm to 1.0 mm thick. No adhesive is necessary to bond the sheets 11 and 12 to the foaming mass 7 since the foaming mass 7 is sticky until it is completely cured.

Figure 3:
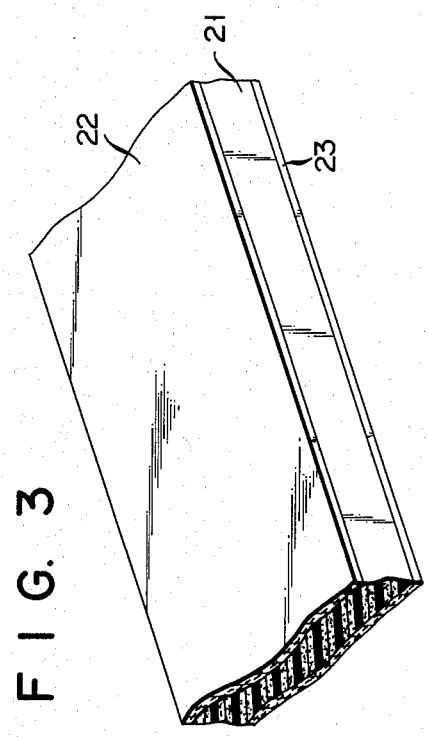
FIG. 3 is a perspective view of a laminated article produced by the apparatus shown in FIG. 2.

FIG. 3 illustrates a final product produced by the apparatus shown in FIG. 2. This is a slab 21 of soft polyurethane foam having two sheets 22 and 23 laminated on the top and under surfaces, respectively.

Figure 4:
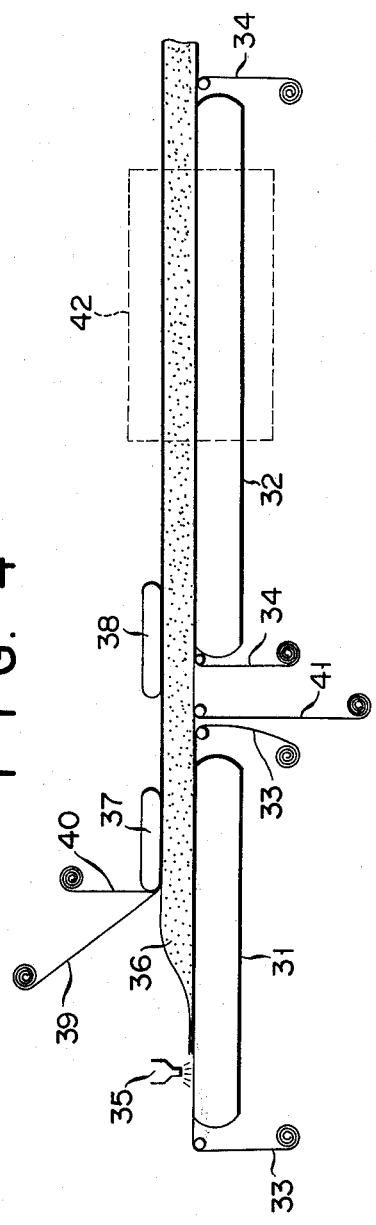
FIG. 4 is a schematic side view of an apparatus of this invention for producing polyurethane foam slabs each having a fabric sheet laminated on at least one of its surfaces.

FIG. 4 shows the essential parts of an apparatus for producing a polyurethane foam slab which has a fabric sheet on at least one of its surfaces.

As shown in FIG. 4, a pair of endless belt conveyors 31 and 32 which are aligned with each other with a predetermined space between them. A first under film 33 made of releasable material travels on the belt conveyor 31, fed from one end of the conveyor 31 and taken up at the other end thereof. Similarly, a second under film 34 made of releasable material travels on the belt conveyor 32, fed from said space and taken up at the other end thereof. The films 33 and 34 travels in the same direction as the belts of the conveyors 31 and 32. If the belts of the conveyors 31 and 32 are made of releasable material, these films 33 and 34 are unnecessary.

On the upper surfaces of the endless belts of the belt conveyors 31 and 32 a pair of vertical sheets (not shown), which are opposite to and spaced from each other, travel in synchronism with the endless belts and in the same direction as the endless belts. These sheets constitute the sidewalls of a horizontally moving trough, the bottom of which is constituted by the endless belts or films 33 and 34. Into the trough thus constituted a foamable polyurethane composition is supplied through a feed nozzle 35 which is positioned above the front portion of the first endless belt conveyor 31. As it is carried on the film 33 on the first endless conveyor 31, the foamable polyurethane composition gradually foams to provide a foaming mass 36.

Above the first endless belt conveyor 31 a first endless belt 37 is provided. Similarly, above the second endless belt conveyor 32 a second endless belt 38 is provided. The endless belts 37 and 38 extend in the lengthwise direction of the conveyors 31 and 32 and are aligned with each other in this direction. They lightly press the top surface of the forming mass 36 after completion of foaming but before completion of curing, thereby making the top surface of the mass 36 flat.

An upper fabric sheet 39 is fed into gap between the top surface of the forming mass 36 and the first endless belt 37. Further, an upper film 40 made of releasable material is fed into a gap between the upper fabric sheet 39 and the first endless belt 37. Both the upper fabric sheet 39 and the upper film 40 travel under both endless belts 37 and 38 together with the foaming mass 36. The upper film 40 is taken up about a take-up means (not shown). If the endless belts 37 and 38 are of releasable material, the upper film may be omitted. An under fabric sheet 41 is fed through the space between the endless belt conveyors 31 and 32 into a gap between the second under film 34 and the foaming mass 36. At this time the foaming mass 36 is completely foamed but remains adhesive. The under fabric sheet 41 is therefore well bonded to the mass 36 as the second endless belt 38 presses the foaming mass 36 downwardly. Likewise, the upper fabric sheet 39 is well bonded to the foaming mass 36 as the first endless belt 37 and the second endless belt 38 press the foaming mass 36 downwardly.

The rear half or downstream portion of the second endless belt conveyor 32 is placed in a heating furnace 42. The furnace 42 heats the foaming mass 36 on the second endless conveyor 32 to promote the curing of the mass 36.

The foaming mass 36 on the second endless belt conveyor 32 is no longer a liquid when it comes into contact with the under fabric sheet 41. Thus, the polyurethane composition, which is a liquid, has no chance to soak into the underfabric sheet 41 laid on the bottom of the horizontally moving trough. The soft touch of the under fabric sheet 41 is never damaged.

What we claim is:

1. An apparatus for continuous production of a slab of polyurethane foam having a fabric sheet laminated on at least one of its surfaces, comprising:
    (A) a horizontally moving trough which comprises a bottom plate or surface portion including first and second endless belt conveyors arranged one after the other in a horizontal direction and a pair of sidewalls each including a horizontally movable vertical sheet;
    (B) feeding means for feeding a foamable polyurethane composition to the moving trough to form a foaming mass on the moving trough;
    (C) pressure means for lightly pressing the top surface of the foaming mass over a zone including a zone extending from the foaming completion point to a point just prior to the completion of curing; and
    (D) sheet feeding means for continuously feeding a fabric sheet between the under surface of the foaming mass and the second endless belt conveyor through the space between the first and second endless conveyors while said foaming mass remains adhesive though completely foamed, so as to bond the fabric sheet to the under surface of said foaming mass substantially without impregnating the fabric sheet with the polyurethane composition.

2. An apparatus according to claim 1, further comprising means for continuously feeding a releasable sheet between said second endless belt conveyor and said fabric sheet fed by said sheet feeding means and means for stripping off the releasable sheet after said foaming mass has been fabricated.

3. An apparatus according to claim 1, further comprising a further sheet feeding means for continuously feeding a fabric sheet between said pressure means and the top surface of said foaming mass while said foaming mass remains adhesive though completely foamed, so as to bond the fabric sheet to the top surface of said foaming mass substantially without impregnating said top fabric sheet with the polyurethane composition.

4. An apparatus according to claim 1 or 3, further comprising heating means for heating said foaming mass which is being carried on said second endless belt conveyor.

5. An apparatus according to claim 4, wherein said heating means comprises a heating furnace, the rear or downstream portion of said second endless belt conveyor, as seen in the direction of conveying, being placed in said heating furnace for heating said foaming mass which is being carried on said second endless belt conveyor.

* * * * *